United States Patent Office 3,335,569
Patented Aug. 15, 1967

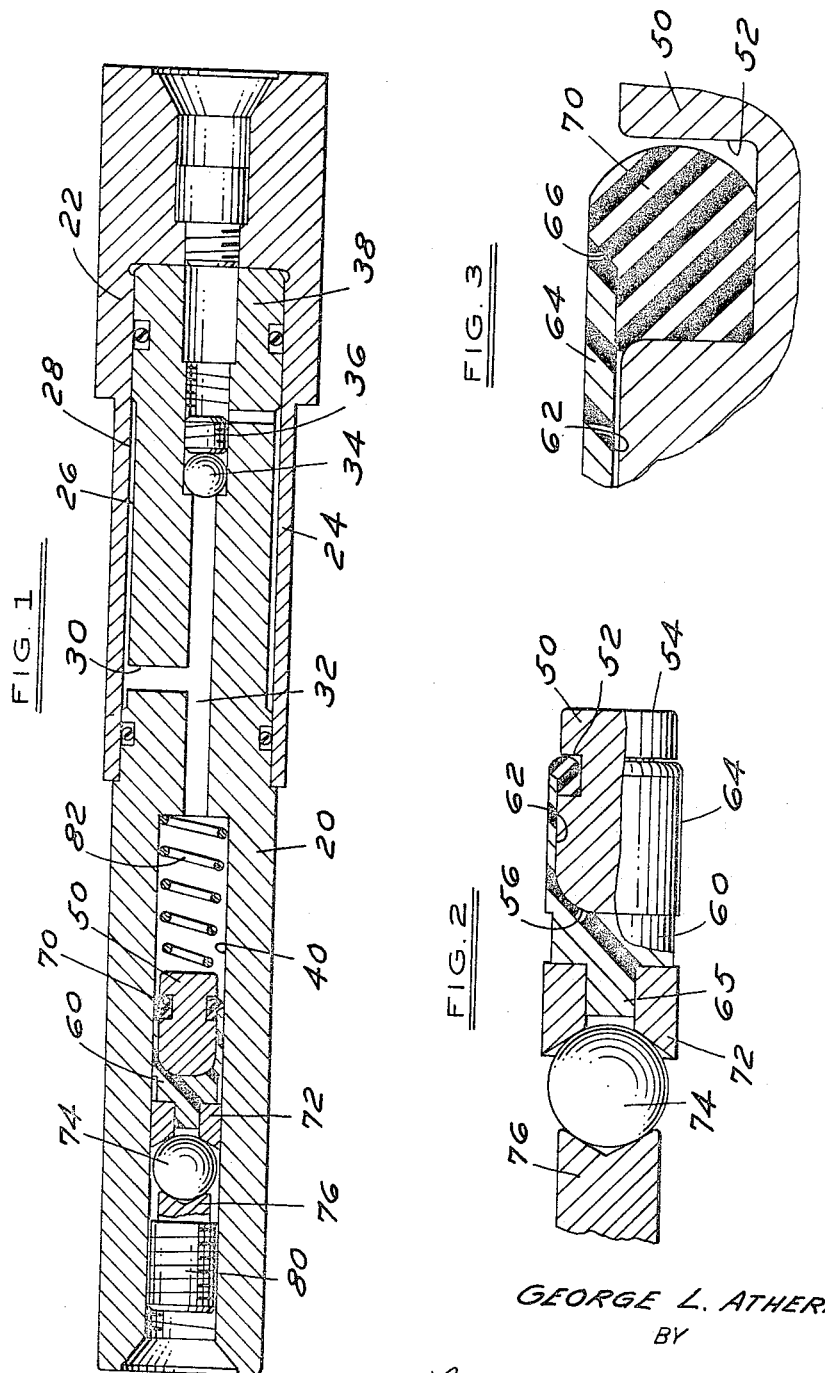

3,335,569
EXPANDING MANDREL CONSTRUCTION
George L. Atherholt, Sr., Warren, Mich., assignor to
A & C Engineering Company, Warren, Mich., a corporation of Michigan
Filed Aug. 18, 1966, Ser. No. 573,399
2 Claims. (Cl. 60—54.5)

This invention relates to an expanding mandrel construction and more particularly to a pressure developing device utilized in these constructions for the application of extremely high pressures to a body of material which transmits the expanding force.

In devices of this kind, one of the problems is the controlling of the fluid at the pressure application point to prevent leakage past the moving part which is driving into the fluid body.

Another problem has been that motion of the pressure applying part sometimes, in moving repeatedly from pressure to release positions, has caused a pumping action which has depleted the pressure material from the reservoir in which it is intended to be confined. It is, therefore, an object of the present invention to provide a pressure application device which seals in the pressure material under repeated actuations, whether manually operated or operated by a force applying means such as leverage device or a pneumatic or hydraulic actuation system.

Another object of the invention is the provision of a device which will have long life under repeated operation and a device which will also adapt itself to the wearing of certain wall surfaces to prevent leakage after extended use.

Other objects and features of the invention will be apparent in the following specification which contains a written description of the invention and the manner of making and using it and which sets forth the best mode contemplated for carrying out the invention.

Drawings accompany the disclosure and the various views thereof may be briefly described as:

FIGURE 1, a sectional view of an expanding mandrel showing the relationship of the parts in assembly.

FIGURE 2, a detail of the particular pressure application device removed from the operating bore.

FIGURE 3, an enlarged section of a particular area of the pressure application device showing the relationship of the parts in assembly.

Referring to the drawings, a holding device is shown having a body portion 20 combined with a second body portion 22, the two parts overlapping wherein a thin walled cylinder 24, integral with the head 22, overlies a very thin annular recess 26 formed on the body portion 20. This leaves a small annular chamber 28 which is connected by a radial passage 30 to an axial passage 32. The passage 32 is sealed by a ball 34 driven into place by a screw plug 36.

The end of the body portion 20 telescopes at 38 into an enlarged bore in the head 22 to create a sealing relationship. This structure thus described constitutes a so-called expanding mandrel or hydrostatic holding device wherein gears and other parts with a central circular opening can be accurately and concentrically held on the surface of the sleeve 24. In this construction, a body of heavy fluid such as a grease is filled into the recess 28 and the pasages 30 and 32 and into an axial bore 40 leading to the passage 32.

The pressure developing device is located in the bore 40 this being the area where the greatest sealing problems are met. In the particular structure of the present invention, the device comprises (FIGURE 2) a leading, bullet-shaped, core member 50 preferably formed of a non-corrosive, reasonably soft material such as brass, this core member having an annular groove 52 and having a blunt end at 54 and a radiused end at 56. A sheath member having a solid body portion 60 and a thin walled extension 64 is telescoped over the core member 50 and has a recess 62 shaped to complement the rounded end of the core member, the thin walled area 64 ending in a feathered annular portion 66. This thin wall extends about one-half way across the annular O-ring opening 52 which contains a standard O-ring 70 of high quality, this O-ring having a reasonably snug fit in its groove for purposes to be pointed out later.

The sheath member 60 also has a small pilot portion 65 in the present embodiment although this may be omitted in some applications. Backing up the sheath member is a pressure applicator slug 72 provided in this instance with a central hole for receiving the pilot projection 65. This slug is also provided with a conical recess at one end to adapt to a ball 74 driven by a driver 76 on the end of a threaded plug 80. A spring 82 backs up core member 50 to assist in a return stroke in the back off movement. The sheath member 60 is preferably formed of a high density plastic material such as nylon which has a good bearing characteristic and also is flexible enough to adapt to the pressure exerted on it. The slug portion 72 can be formed of brass and the ball 74 is preferably a hardened steel ball. As the parts are shown in assembly, it will be noted that the wall portion 64 of the sheath member 60 is confining a portion of the O-ring 70 to compress it leaving a portion of the O-ring in contact with the wall of the bore 40. The wall 64 is sufficiently thin and pliable that this pressure of the O-ring will cause a small degree of bell-mouthing to force the wall 64 into intimate contact with the walls of the bore 40. This is the focal area for the sealing device, and it will be recognized that should there be a wear due to repeated operation of the piston in the bore, there will be automatic compensation for this wear.

The piston is used at extremely high pressures such as 20,000 lbs. per square inch and sometimes the devices are operated as high as internal pressures of 42,000 lbs. per square inch. The nylon that is used for the sheath 60 is preferably an annealed nylon, and the complementing shape of the core 50 with the sheath 60 provides an intimate pressure transferring area which prevents cracking of the nylon, and also creates an expanding force on the nylon which moves it out to the confining walls.

In addition, the overlie of the wall 64 on the O-ring protects the O-ring so that higher pressures may be utilized and the nose portion of the core member 54 protects the thin walls of the sheath member 60 should there be a bottoming of the device in the particular bore in which it is used. The snug fit axially of the O-ring in the groove 52, which is contrary to the general application of O-rings, prevents a pumping action which has proved to be disadvantageous in previous devices. In addition, the O-ring being confined, as well as withstanding higher pressures, is subject to less wear and holds the walls of the sheath member in operating position. The disclosed device has proved to be extremely effective for high pressure operation with a long life cycle.

What I claim is:

1. In a holding device which utilizes the expansion of walls due to a hydrostatic pressure of a pressure transmitting material contained within a chamber adjacent those walls, a means forming a bore connected to said chamber and an improved pressure developing assembly within said bore comprising:

(a) a solid core member comprising a bullet-shaped piece of non-corrosive material having a diameter less than said bore and a trailing end of rounded shape and having formed therein an annular groove spaced from a leading end, (b) a sheath member behind said core member having a solid body portion and a thin wall extension at one end, each with an outer diameter substantially equal to the diameter of said bore, said extension having an internal diameter to telescope snugly over a portion of the rounded end of said core and terminating within the axial confines of said annular groove, (c) an O-ring in said groove partially covered axially and deformed inwardly by the end of said thin wall extensions, and (d) means to apply axial pressure on the body portion of said sheath member to force said assembly into said bore against a body of pressure transmitting material.

2. In a holding device which utilizes the expansion of walls due to a hydrostatic pressure of a pressure transmitting material contained within a chamber adjacent those walls, a means forming a bore connected to said chamber and an improved pressure developing assembly within said bore comprising:

(a) an elongate core member within said bore of slightly less diameter than said bore, (b) an O-ring on said core member adjacent a leading end thereof in said bore dimensioned to contact the walls of said bore, and (c) a combination drive and sheath member having a body portion axially backing said core member and a thin wall extension telescoping over a portion of said core member and overlying, in a radial compressive position, a portion of said O-ring, and (d) means to apply axial pressure on the body portion of said sheath member to force said assembly into said bore against a body of pressure transmitting material.

References Cited

UNITED STATES PATENTS

| | | | |
|---|---|---|---|
| 2,744,756 | 5/1956 | Atherholt et al. | 279—2 |
| 2,963,298 | 12/1960 | Better et al. | 279—4 |
| 3,182,568 | 5/1965 | Davis | 92—240 X |

MARTIN P. SCHWADRON, *Primary Examiner.*

ROBERT R. BUNEVICH, *Examiner.*